United States Patent
Tillis

(10) Patent No.: US 7,939,123 B2
(45) Date of Patent: May 10, 2011

(54) DEEP FRIED EGG-BASED FOODSTUFF

(75) Inventor: Marc Tillis, Roseville, MN (US)

(73) Assignee: Rembrandt Enterprises, Inc., Rembrandt, IA (US)

( * ) Notice: Subject to any disclaimer, the term of this patent is extended or adjusted under 35 U.S.C. 154(b) by 1148 days.

(21) Appl. No.: 11/598,557

(22) Filed: Nov. 13, 2006

(65) Prior Publication Data

US 2007/0087105 A1    Apr. 19, 2007

Related U.S. Application Data

(63) Continuation-in-part of application No. 11/051,293, filed on Feb. 4, 2005, now abandoned.

(51) Int. Cl.
*A23L 1/32* (2006.01)
(52) U.S. Cl. ........................................ 426/614; 426/438
(58) Field of Classification Search .................. 426/614, 426/438
See application file for complete search history.

(56) References Cited

U.S. PATENT DOCUMENTS

| | | | | |
|---|---|---|---|---|
| 3,073,704 | A | 1/1963 | Rivoche | 426/573 |
| 3,537,386 | A | 11/1970 | Grosbard | 99/353 |
| 4,469,708 | A | 9/1984 | Rapp et al. | 426/103 |
| 5,151,293 | A | 9/1992 | Vassiliou | 426/614 |
| 6,413,572 | B1 * | 7/2002 | Knipper et al. | 426/614 |
| 6,620,449 | B1 * | 9/2003 | Peers | 426/523 |
| 7,241,469 | B2 * | 7/2007 | Mathews | 426/614 |
| 2003/0118714 | A1 | 6/2003 | Merkle et al. | 426/614 |
| 2003/0134030 | A1 | 7/2003 | Merkle et al. | 426/614 |
| 2004/0067283 | A1 | 4/2004 | Hudson et al. | 426/94 |

FOREIGN PATENT DOCUMENTS

| | | |
|---|---|---|
| JP | 56121457 | 9/1981 |
| JP | 58040069 | 3/1983 |
| JP | 58043764 | 3/1983 |
| JP | 2000175656 | 6/2000 |
| JP | 2002191327 | 7/2002 |
| JP | 2002223728 | 8/2002 |
| JP | 2002306347 | 10/2002 |
| JP | 2004298100 | * 10/2004 |
| WO | WO 00/32078 | 6/2000 |

OTHER PUBLICATIONS

Webpage, Deep Fried Eggs, Oct. 11, 2004, 1 page.
Webpage, Deep-Fried Coated Eggs, Oct. 11, 2004, 1 page.
Hormel Foods website, Glossary term for French Fry. http://www.hormel.com/kitchen/glossary.asp?id=33328&catitemid=.
Grodner et al., "Chemical Composition of Seafood Breading and Batter Mixes", Cereal Chemistry, 68 (2):162-164.

* cited by examiner

*Primary Examiner* — Anthony Weier
(74) *Attorney, Agent, or Firm* — Z. Peter Sawicki; Westman, Champlin & Kelly, P.A.

(57) ABSTRACT

A method of making an egg based product includes providing a selected amount of a liquid egg base that is poured onto a cooking surface such that the egg base has a selected thickness. The egg base is heated to a selected temperature such that the liquid egg base coagulates into a solid mass. The solid mass is cut and transferred to a deep fryer where the solid mass is deep fried for a selected amount of time in a selected oil or fat. The deep fried solid mass is removed from the selected oil or fat for consumption or storage.

15 Claims, No Drawings

DEEP FRIED EGG-BASED FOODSTUFF

The present application is a continuation-in-part application of and claims priority of U.S. patent application Ser. No. 11/051,293, filed Feb. 4, 2005, the content of which is hereby incorporated by reference in its entirety.

BACKGROUND OF THE INVENTION

The present invention relates to a deep fried egg based product. More particularly, the present invention relates to a deep fried egg based product made to resemble a fried potato product such as a French fry.

Eggs are a very nutritious food source that have a high protein content and essentially no carbohydrate content. Whole eggs contain on average 65.5 weight percent water, 12 weight percent protein, 11 weight percent fat with the remainder being made up of other constituents (USDA Egg Grading Manual 1969. Agricultural Handbook No. 75). The popularity of eggs as a food source has increased with the increase in popularity of high protein/low carbohydrate diets such as the Atkins Diet.

Many people find staying on the strict high protein/low carbohydrate diet to be burdensome because most meals purchased at a restaurant include some form of carbohydrates, typically as a bread product or as a potato product. For instance, prior to consuming food from a fast food restaurant such as a hamburger, the dieter must remove the bun and cannot eat potato based French fries that are typically sold along with the hamburger. As a result, most dieters on the Atkins diet do not eat at fast food restaurants which can pose an inconvenience to people with busy schedules.

Because most restaurants do not have menu items that conform to the high protein/low carbohydrate diet, most dieters are forced to prepare their own food. With the busy and fast paced lifestyles of many people, there is not enough time to prepare every meal. Therefore, the dieter may find trying to maintain the high protein/low carbohydrate diet incompatible with his/her lifestyle.

Further, maintaining the high protein/low carbohydrate diet can be difficult due to the limited number and types of food that can be consumed. The dieter can easily become bored with the limited selection and stray from the high protein/low carbohydrate diet. Many times the dieter may simply want a sandwich, an item that is not in compliance with the high protein/low carbohydrate diet because of the carbohydrates in the bread.

To accommodate the trend to the high protein/low carbohydrate diet, high protein/low carbohydrate breads are being sold to allow dieters to eat some bread products while staying on the strict diet. However, there is a need to develop high protein/low carbohydrate substitutes for potato based products, such as the popular French fry.

SUMMARY OF THE INVENTION

The present invention includes a method of making an egg based product. The method includes heating a liquid egg base to a selected temperature such that the liquid egg base coagulates into a solid mass. The solid mass is cut then transferred to a deep fryer where the solid mass is deep fried for a selected amount of time in a selected oil or fat. The deep fried solid mass is removed from the selected oil or fat for consumption or storage. The deed fried solid mass has a crisp exterior with no exterior batter, the crisp exterior having a texture of a deep fried French fry potato. The present invention also includes a deep fried egg based product comprising an egg based mixture sufficiently cooked to form a coagulated mass and wherein the coagulated mass is deep fried in a selected oil or fat. After deep frying, the coagulate mass has a crisp exterior with no exterior batter, the crisp exterior having a texture of a deep fried French fry potato. The present invention also includes an egg based product comprising a coagulated mass of a scrambled egg mixture formed into a shape of a French fry and wherein the French fry shaped coagulated mass is deep fried for a selected period of time in a selected cooking oil. The French fry shaped coagulate mass has a crisp exterior with no exterior batter, the crisp exterior having a texture of a deep fried French fry potato.

DETAILED DESCRIPTION OF THE PREFERRED EMBODIMENTS

The present invention relates to a deep fried egg based product and a method of producing the deep fried egg based product. The deep fried egg based product has a high protein content and a low carbohydrate content, thereby providing an alternative to the potato based products such as French fry which has a high carbohydrate content.

The deep fried egg based product is preferably shaped like a French fry. However, other configurations of the deep fried egg based product are within the scope of the present invention. The deep fried egg based product has a crisp exterior similar to the texture of a deep fried French fry. The deep fried egg base product does not have a dough exterior. **Insert B from other app A starting egg ingredient for the egg based product is egg whites, egg yokes or scrambled whole eggs. The starting egg ingredient should be stirred to produce as homogenous a blend as possible. Reconstituted egg solids may also be used as a starting ingredient in the present invention. A commercially available scrambled egg mixture (SEM) may also be used as a starting ingredient for the egg based product. Hereinafter throughout the application, the phrase egg mixture (EM) shall mean scrambled whole eggs, the egg whites, the egg yokes, the reconstituted egg solids or the commercially available scrambled egg mixture or any mixture thereof.

The EM is poured onto a cooking sheet that is configured to retain the EM at a selected thickness. The EM is heated to an effective temperature to coagulate the EM into a solid mass or a matrix. The EM is typically heated until the temperature of the EM elevates to a temperature of between about 140° F. and about 190° F.

The EM can be heated to the coagulating temperature with any suitable cooking device. Coagulation of the EM begins at approximately 155° F. and fully coagulates at 180° F. to 190° F. The EM can be heated in an oven with a single cooking sheet at a time. The EM can also be heated in a band oven with a continuous cooking sheet. The temperature of the oven is in a range of between about 250° F. to about 450° F. and preferably in a range of between about 300° F. and about 400° F., and most preferably between 340° F. to 360° F. for up to about 5 minutes to 10 minutes.

The EM can also be placed in a plastic boiling bag and submerged in a hot liquid to heat the EM to the coagulating temperature. The EM can also be heated to coagulating temperatures in an extruder where the EM is formed into a continuous ribbon of coagulated mass having a selected crosssection. Alternatively, the EM can be partially heated to coagulating temperatures in the extruder and heated to coagulating temperatures in another heating source such as an oven. Whatever the heating source, the EM is heated to the selected temperature to form a coagulated solid mass or matrix.

After the coagulated mass is formed, the coagulated mass is cut into pieces having any configuration. Preferably, the coagulated mass is cut into a shape that resembles a French fry. French fries come in various shapes including, but not limited to a traditional longitudinal strip having a substantially square cross sectional area, a "shoe string" shape which is a narrow version of the traditional French fry, a traditional French fry shape but with a rippled surface, an American fry shape which is usually a thin disk, a crosscut fry shape (a thin disk with a crisscross pattern), or any other shape. Depending upon the scope of production of the egg based product, the coagulated mass can be manually cut or cut with a cutting machine. The EM can also be heated to the coagulating temperature in molds thereby eliminating the need to cut the coagulated mass into the desired configuration.

The cut pieces of coagulated mass are submerged in a cooking oil or fat at a selected cooking temperature for a selected amount of time such that the EM pieces have a crisp surface similar to that of a deep fried French fry. The cut coagulated pieces may also be frozen and then deep fried. The EM is deep fried at temperatures in a range of between about 300° F. and about 450° F. and preferably at temperatures in a range of between about 325° F. and about 400° F. for about 0.5 to 5 minutes.

A non-exhaustive list of suitable cooking oils that can be used to practice the present invention include olive oil, coconut oil, peanut oil, sunflower oil, corn oil, canola oil, safflower oil, soybean oil, avocado oil, almond oil, cottonseed oil, sesame oil, grape seed oil, walnut oil and vegetable oil. A non-exhaustive list suitable cooking fats or fat substitutes that can be used to practice the present invention include lard and vegetable shortening.

The deep fried EM may be consumed or stored for later consumption. Optionally, a seasoning may be coated onto the deep fried EM. A non-exhaustive list of seasonings include salt, pepper, salt substitutes, spices, extracts various flavorants, cheese powders and coatings that are well known and found on any snack foods in either a liquid or solid state.

Prior to heating the EM to coagulating temperatures, optional generally recognized as safe ingredients (GRAS) may be added to the EM to modify or enhance the flavor, texture and appearance of the deep fried egg based product. Water is preferably added to the EM to make the consumable product lighter and less dense. While an optional ingredient, water is preferably added to the EM in a range of between about 10 weight percent and 20 weight percent of the weight of the EM.

Water binding ingredients, such as water binding carbohydrates and hydrophilic colloids, are optionally and preferably added at an effective weight percentage to keep the water from separating from the EM during the heating and deep frying process. A non-exhaustive list of water binding carbohydrates that can be added to the EM includes a pre-gel starch, refined potato such as potato flour or potato flakes, corn starch, modified corn starch, arrow root starch, tapioca starch or any combination thereof. A non-exhaustive list of hydrophilic colloids that can be added to the EM includes xanthan gum, locust bean gum, carob gum, guar gum, carrageenan and pectin or any combination thereof.

Vegetable oil may optionally be added to the EM to enhance mouth feel on the finished product. Vegetable oils that are added to the EM include, but are not limited to, olive oil, coconut oil, peanut oil, sunflower oil, corn oil, canola oil, safflower oil and soybean oil. The vegetable oils are optionally added to the EM in a range of up to about 12 weight percent of the EM and preferably about 3 weight percent of the EM.

Other GRAS ingredients can be added to the EM to enhance the taste of the egg based product prior to heating the EM into the coagulated mass. A non-exhaustive list of ingredients include vegetables, fruit, meat or dairy products such as cheese and natural or artificial flavors or both. The vegetables, fruit, meat and dairy products are added to selected weight percents of the deep fried egg based product provided the deep fried egg based product has a continuous EM portion with the other ingredients dispersed therein. Typically up to about 25 weight % of the product may be a GRAS ingredient and up to about 50 weight % if broccoli is the GRAS ingredient.

It has been discovered that the method of the present invention and the resulting products manufactured by the method are very palatable, high protein alternatives to traditionally high carbohydrate food stuffs such as French fries. The following Examples are illustrative only and are not intended to limit the present invention in any way.

Example 1

An EM was produced having the following composition:

| Whole Scrambled Eggs | 75.2 |
|---|---|
| Water | 17.0 |
| Pre-Gel Starch | 0.75 |
| Xanthan Gum | 0.05 |
| Potato Flakes | 4.0 |
| Vegetable Oil | 3.0 |

The ⅜ inch thick sheet of EM was heated in an oven at 450° F. for 12 minutes until the EM coagulated into a solid mass.

The coagulated mass was cut into strips resembling French fries. The strips were deep fried in a soy oil at about 340° F. for about 1 minute 10 seconds. The deep fried coagulated egg based strips had a crisp surface and a pleasing texture and taste. The texture was crisp and similar to a potato based French fry.

Example 2

An EM was produced having the following composition:

| Whole Scrambled Eggs | 76.7 |
|---|---|
| Water | 18.5 |
| Pre-Gel Starch | 0.75 |
| Xanthan Gum | 0.05 |
| Potato Flour | 1.0 |
| Vegetable Oil | 3.0 |

The ⅜ inch sheet of EM was heated in an oven at 350° F. for 12 minutes until the EM coagulated into a solid mass.

The coagulated mass was cut into strips resembling French fries. The strips were deep fried in a vegetable oil at about 340 to 375° F. for about 1 minute 10 seconds. The deep fried coagulated egg based strips had a crisp surface and a pleasing texture and taste. The texture was crisp and similar to a potato based French fry. However, when compared to the product in Example 1, the carbohydrate content was reduced by about 3.0 weight percent while maintaining the desired organoleptic properties.

Example 3

An EM was produced with jalapeno peppers evenly dispersed therein. The EM had the following composition:

| | |
|---|---|
| Whole Scrambled Eggs | 70.25 |
| Water | 16.0 |
| Pre-Gel Starch | 0.7 |
| Xanthan Gum | 0.05 |
| Potato Flakes | 4.0 |
| Vegetable Oil | 3.0 |
| Jalapenos in brine | 6.0 |

The EM was heated in an oven as in Example 2. The temperature of the solid coagulated mass or matrix was 185 to 200° F.

The coagulated mass or matrix was cut into strips resembling French fries. The strips were deep fried in a vegetable oil at about 340 to 375° F. for about 1 minute 10 seconds. The deep fried coagulated egg based strips had a crisp surface and a pleasing texture and taste. The texture was crisp and similar to a potato based French fry.

Example 4

An EM was produced with chopped broccoli evenly dispersed therein. The EM had the following composition:

| | |
|---|---|
| Whole Scrambled Eggs | 56.5 |
| Water | 13.75 |
| Pre-Gel Starch | 0.7 |
| Xanthan Gum | 0.05 |
| Potato Flour | 1.0 |
| Vegetable Oil | 3.0 |
| Chopped Broccoli | 25.0 |

The EM was heated in an oven as in Example 2. The temperature of the solid coagulated mass was 185 to 200° F.

The coagulated mass was cut into strips resembling French fries. The strips were deep fried in a vegetable oil at about 340° F. for about 1 minute 10 seconds. The deep fried coagulated egg based strips had a crisp surface and a pleasing texture and taste. The texture was crisp and similar to a potato based French fry. Further this example illustrates that a flavoring component such as broccoli can be dispersed at high weight percents (up to about 50 weight %) of the consumed product to affect the taste without altering the process conditions at which the product is produced.

Example 5

An EM was produced with whole eggs and egg whites blended together. The EM had the following composition:

| | |
|---|---|
| Whole Scrambled Eggs | 37.52 |
| Egg Whites | 37.35 |
| Water | 17.0 |
| Pre-Gel Starch | 1.0 |
| Xanthan Gum | 0.1 |
| Potato Flakes | 4.0 |
| Vegetable Oil | 3.0 |
| Beta-Carotene (Colorant) | 0.03 |

The EM was heated in an oven as in Example 2. The temperature of the solid coagulated mass was 185 to 200° F.

The coagulated mass was cut into strips resembling French fries. The strips were deep fried in a vegetable oil at about 340° F. for about 1 minute 10 seconds. The deep fried coagulated egg based strips had a crisp surface and a pleasing texture and taste. The texture was crisp and similar to a potato based French fry.

This example illustrates that egg fractions or variants can be used to produce the product of the present invention. Approximately 50 weight percent of the egg portion of the product was egg white without the yoke. Because the egg white is less viscous than egg yoke, more Pre-Gel starch and xanthan gum were used than in Examples 1-4. Beta-carotene was added to produce the yellow color expected where the entire egg portion is whole scrambled eggs.

Although the present invention has been described with reference to preferred embodiments, workers skilled in the art will recognize that changes may be made in form and detail without departing from the spirit and scope of the invention.

What is claimed is:

1. A deep fried egg based product having the shape and crisp texture similar to a potato based French fry with no exterior batter, the product resulting from an egg based mixture sufficiently cooked to form a coagulated mass and wherein the coagulated mass is deep fried in a selected oil or fat under conditions to produce the crisp texture.

2. The deep fried egg based product of claim 1 and wherein the egg based mixture comprises scrambled whole eggs.

3. The deep fried egg based product of claim 1 and wherein the egg based mixture comprises:
   a selected amount of an egg component; and
   a selected amount of water.

4. The deep fried egg based product of claim 3 and wherein the egg component comprises more than 65 weight percent of the egg based mixture.

5. The deep fried egg based product of claim 1 and wherein the egg based mixture further comprises a vegetable oil.

6. The deep fried egg based product of claim 5 and wherein the vegetable oil comprises up to about 12 weight percent of the egg based mixture.

7. The deep fried egg based product of claim 1 and wherein the egg based mixture further comprises a water binding carbohydrate.

8. The deep fried egg based product of claim 7 and wherein the water binding carbohydrate comprises a starch component.

9. The deep fried egg based product of claim 1 and further comprising flavoring components including vegetables, fruit, meat, dairy based products, natural and artificial flavors.

10. The deep fried egg based product of claim 1 and further including a flavoring component wherein the flavoring component comprises up to 50 weight percent of the deep fried egg based product.

11. An egg based product comprising a coagulated mass of a scrambled egg mixture formed into a shape of a French fry and wherein the French fry shaped coagulated mass is deep fried for a selected period of time in a selected cooking oil under conditions such that the French fry shaped mass has a crisp texture similar to a potato based French fry with no exterior batter.

12. The egg based product of claim 11 and the scrambled egg mixture further comprises a water binding carbohydrate.

13. The egg based product of claim 11 and further comprising a selected amount of a flavoring component.

14. The egg based product of claim 13 and wherein the flavoring component comprises seasonings, vegetables, fruit, meat, dairy products, or natural or artificial flavors.

15. The egg based product of claim 14 wherein the flavoring component comprises up to 50 weight percent of the deep fried egg based product.

* * * * *

UNITED STATES PATENT AND TRADEMARK OFFICE
CERTIFICATE OF CORRECTION

Page 1 of 1

PATENT NO. : 7,939,123 B2
APPLICATION NO. : 11/598557
DATED : May 10, 2011
INVENTOR(S) : Marc Tillis It is certified that error appears in the above-identified patent and that said Letters Patent is hereby corrected as shown below:

Column 2, lines 29-30: please delete "**Insert B from other app".

Signed and Sealed this
Thirteenth Day of December, 2011

David J. Kappos
*Director of the United States Patent and Trademark Office*